(12) United States Patent
Bialer et al.

(10) Patent No.: US 11,181,614 B2
(45) Date of Patent: Nov. 23, 2021

(54) ANTENNA ARRAY TILT AND PROCESSING TO ELIMINATE FALSE DETECTIONS IN A RADAR SYSTEM

(71) Applicant: GM Global Technology Operations LLC, Detroit, MI (US)

(72) Inventors: Oded Bialer, Petah Tivak (IL); Amnon Jonas, Jerusalem (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 377 days.

(21) Appl. No.: 16/433,482

(22) Filed: Jun. 6, 2019

(65) Prior Publication Data
US 2020/0386855 A1  Dec. 10, 2020

(51) Int. Cl.
*G01S 7/28* (2006.01)
*G01S 13/931* (2020.01)
*H01Q 3/26* (2006.01)

(52) U.S. Cl.
CPC .......... *G01S 7/2813* (2013.01); *G01S 13/931* (2013.01); *H01Q 3/26* (2013.01)

(58) Field of Classification Search
CPC ........ G01S 13/931; G01S 7/2813; H01Q 3/26
See application file for complete search history.

(56) References Cited

U.S. PATENT DOCUMENTS

| | | | | |
|---|---|---|---|---|
| 5,574,468 A * | 11/1996 | Rose | ........................ | G01S 3/043 342/424 |
| 5,675,343 A * | 10/1997 | Champeau | ............. | H01Q 21/22 342/372 |
| 5,933,109 A * | 8/1999 | Tohya | .................... | G01S 7/0235 342/175 |
| 6,393,377 B1 * | 5/2002 | Shirai | ...................... | G01S 7/487 702/159 |
| 7,064,710 B1 * | 6/2006 | Ksienski | ................... | H01Q 3/26 342/372 |
| 8,248,298 B2 * | 8/2012 | Lalezari | ................. | H01Q 21/24 342/179 |
| 8,289,203 B2 * | 10/2012 | Culkin | ................. | H01Q 21/061 342/73 |
| 8,299,958 B2 * | 10/2012 | Kemkemian | ......... | G01S 13/426 342/107 |
| 8,466,829 B1 * | 6/2013 | Volman | ...................... | G01S 3/48 342/147 |
| 8,665,137 B2 * | 3/2014 | Wintermantel | ......... | G01S 7/032 342/59 |

(Continued)

*Primary Examiner* — Peter M Bythrow
(74) *Attorney, Agent, or Firm* — Cantor Colburn LLP

(57) ABSTRACT

Systems and methods to identify an object using a radar system involve arranging an array of antenna elements into two or more subarrays with a tilt angle relative to each other. Each of the two or more subarrays includes two or more antenna elements among the array of antenna elements. A method includes receiving reflected signals at each of the two or more subarrays resulting respectively from transmitting transmit signals from the two or more subarrays, and processing the reflected signals at each of the two or more subarrays to obtain an amplitude associated with each azimuth angle in a range of azimuth angles. A location of the object is determined as the azimuth angle in the range of azimuth angles at which the amplitude exceeds a threshold value.

20 Claims, 4 Drawing Sheets

(56) References Cited

U.S. PATENT DOCUMENTS

| | | | | |
|---|---|---|---|---|
| 8,717,224 B2* | 5/2014 | Jeong | G01S 13/931 | 342/70 |
| 8,779,969 B2* | 7/2014 | Shimizu | G01S 7/412 | 342/70 |
| 9,203,160 B2* | 12/2015 | Blech | H01Q 21/061 | |
| 9,423,498 B1* | 8/2016 | Brown | G08G 1/166 | |
| 9,568,600 B2* | 2/2017 | Alland | G01S 7/03 | |
| 9,869,762 B1* | 1/2018 | Alland | H01Q 21/28 | |
| 9,880,262 B2* | 1/2018 | Hayakawa | H01Q 3/267 | |
| 10,141,657 B2* | 11/2018 | Kishigami | G01S 13/4463 | |
| 10,371,796 B2* | 8/2019 | Kishigami | G01S 13/325 | |
| 10,386,462 B1* | 8/2019 | Hong | G01S 13/878 | |
| 10,446,938 B1* | 10/2019 | Wang | H01Q 21/0006 | |
| 10,573,959 B2* | 2/2020 | Alland | G01S 13/86 | |
| 10,615,516 B2* | 4/2020 | Kishigami | G01S 13/22 | |
| 10,629,998 B2* | 4/2020 | Lim | G01S 13/931 | |
| 10,677,918 B2* | 6/2020 | Ding | H01Q 21/061 | |
| 10,823,819 B2* | 11/2020 | Loesch | G01S 13/931 | |
| 10,871,562 B2* | 12/2020 | Trummer | G01S 7/41 | |
| 10,935,650 B2* | 3/2021 | Campbell | G01S 13/90 | |
| 10,965,038 B2* | 3/2021 | Kishigami | G01S 13/003 | |
| 11,047,971 B2* | 6/2021 | Bialer | G01S 13/42 | |
| 2002/0180639 A1* | 12/2002 | Rickett | H01Q 21/061 | 342/372 |
| 2003/0020646 A1* | 1/2003 | Yu | G01S 13/4463 | 342/17 |
| 2003/0164791 A1* | 9/2003 | Shinoda | H01Q 25/02 | 342/70 |
| 2006/0022866 A1* | 2/2006 | Walton | H01Q 9/0407 | 342/194 |
| 2007/0008210 A1* | 1/2007 | Kibayashi | G01S 13/723 | 342/70 |
| 2008/0291087 A1* | 11/2008 | Tietjen | H01Q 21/065 | 342/372 |
| 2009/0085800 A1* | 4/2009 | Alland | G01S 7/034 | 342/25 R |
| 2009/0121916 A1* | 5/2009 | Miyake | G01S 13/42 | 342/70 |
| 2010/0033377 A1* | 2/2010 | Straatveit | H01Q 21/29 | 342/378 |
| 2010/0328157 A1* | 12/2010 | Culkin | H01Q 21/061 | 342/372 |
| 2011/0074620 A1* | 3/2011 | Wintermantel | H01Q 1/3233 | 342/70 |
| 2011/0080314 A1* | 4/2011 | Wintermantel | G01S 13/4454 | 342/147 |
| 2011/0140952 A1* | 6/2011 | Kemkemian | G01S 13/426 | 342/146 |
| 2011/0298676 A1* | 12/2011 | Yanagihara | H01Q 21/06 | 343/711 |
| 2012/0081247 A1* | 4/2012 | Kemkemian | H01Q 3/2605 | 342/29 |
| 2013/0207832 A1* | 8/2013 | Mizutani | G01S 13/06 | 342/70 |
| 2014/0066757 A1* | 3/2014 | Chayat | H01Q 21/064 | 600/430 |
| 2014/0125511 A1* | 5/2014 | Longstaff | G05D 1/0858 | 342/33 |
| 2015/0057833 A1* | 2/2015 | Moriuchi | G01S 13/06 | 701/1 |
| 2015/0084832 A1* | 3/2015 | Al | H01Q 21/061 | 343/893 |
| 2015/0204971 A1* | 7/2015 | Yoshimura | B60W 30/00 | 342/70 |
| 2015/0253419 A1* | 9/2015 | Alland | G01S 13/4463 | 342/385 |
| 2015/0253420 A1* | 9/2015 | Alland | G01S 13/4454 | 342/156 |
| 2015/0285904 A1* | 10/2015 | Rao | H01Q 25/00 | 342/146 |
| 2015/0355313 A1* | 12/2015 | Li | G01S 13/02 | 342/195 |
| 2015/0355315 A1* | 12/2015 | Shimizu | G01S 13/931 | 342/107 |
| 2016/0033632 A1* | 2/2016 | Searcy | G01S 13/4454 | 342/153 |
| 2016/0172767 A1* | 6/2016 | Ray | H01Q 21/22 | 343/893 |
| 2016/0238694 A1* | 8/2016 | Kishigami | G01S 7/292 | |
| 2016/0285172 A1* | 9/2016 | Kishigami | G01S 13/22 | |
| 2016/0365631 A1* | 12/2016 | Huang | H01Q 21/12 | |
| 2016/0380360 A1* | 12/2016 | Gruener | H01Q 5/392 | 343/700 MS |
| 2017/0082730 A1* | 3/2017 | Kishigami | H01Q 21/061 | |
| 2017/0139042 A1* | 5/2017 | Alenljung | G01S 7/2921 | |
| 2017/0276786 A1* | 9/2017 | Smith | G01S 7/003 | |
| 2018/0038950 A1* | 2/2018 | Cornic | G01S 13/931 | |
| 2018/0088224 A1* | 3/2018 | Kishigami | G01S 7/02 | |
| 2018/0109000 A1* | 4/2018 | Lim | H01Q 13/10 | |
| 2018/0120427 A1* | 5/2018 | Cornic | G01S 13/4463 | |
| 2018/0348346 A1* | 12/2018 | Vallespi-Gonzalez | G01S 7/4802 | |
| 2019/0058262 A1* | 2/2019 | Maruyama | G01S 7/2813 | |
| 2019/0115670 A1* | 4/2019 | Kishigami | G01S 13/003 | |
| 2019/0137616 A1* | 5/2019 | Kishigami | G01S 13/42 | |
| 2019/0293753 A1* | 9/2019 | Iwasa | G01S 7/03 | |
| 2019/0324136 A1* | 10/2019 | Amadjikpe | H04B 7/0434 | |
| 2019/0386712 A1* | 12/2019 | Fang | H04B 7/043 | |
| 2019/0391230 A1* | 12/2019 | Loesch | H01Q 21/065 | |
| 2020/0103515 A1* | 4/2020 | Kishigami | G01S 13/343 | |
| 2020/0191939 A1* | 6/2020 | Wu | G01S 7/354 | |
| 2020/0225337 A1* | 7/2020 | Kishigami | G01S 13/42 | |
| 2020/0249344 A1* | 8/2020 | Heo | G01S 7/032 | |
| 2020/0393553 A1* | 12/2020 | Kishigami | G01S 13/534 | |
| 2021/0199757 A1* | 7/2021 | Oshima | G01S 7/4914 | |

* cited by examiner

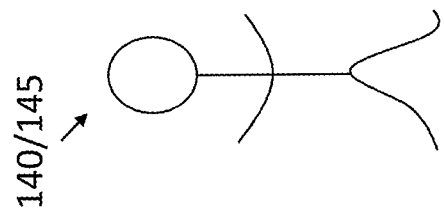
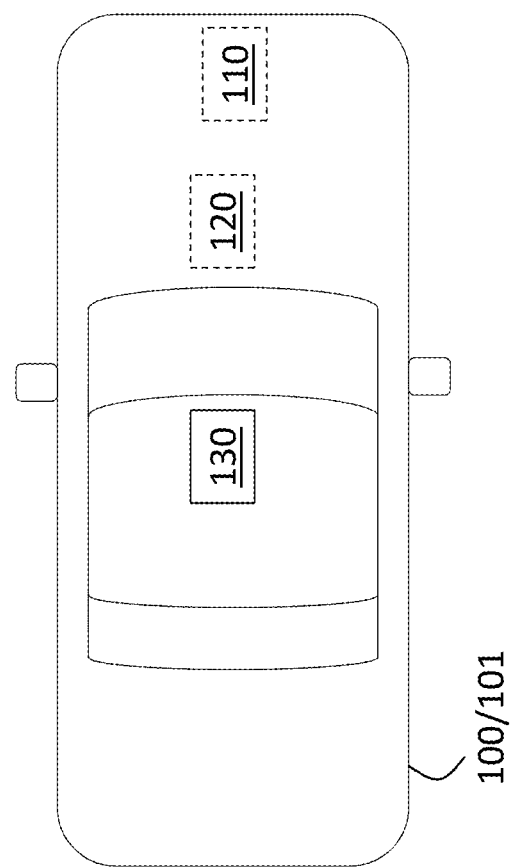
FIG. 1

ANTENNA ARRAY TILT AND PROCESSING TO ELIMINATE FALSE DETECTIONS IN A RADAR SYSTEM

INTRODUCTION

The subject disclosure relates to antenna array tilt and processing to eliminate false detections in a radar system.

Radar systems and other sensors are increasingly used in vehicles (e.g., automobiles, trucks, farm equipment, construction equipment, automated factories) to obtain information about the vehicle and its surroundings. A radar system may identify objects in the path of the vehicle, for example, and facilitate autonomous or semi-autonomous vehicle operation. A radar system having a wide field of view (i.e., wide aperture) facilitates obtaining more information about the surroundings of the vehicle. However, arranging antenna elements at no more than half-wavelength (½λ) spacing over a wide aperture results in a relatively large number of antenna elements and correspondingly high complexity, power, and cost requirements. Yet, a sparser array of antenna elements over the same aperture width results in angle ambiguity that leads to false detections. Accordingly, it is desirable to provide antenna array tilt and processing to eliminate false detections in a radar system.

SUMMARY

In one exemplary embodiment, a method of identifying an object using a radar system includes arranging an array of antenna elements into two or more subarrays with a tilt angle relative to each other. Each of the two or more subarrays includes two or more antenna elements among the array of antenna elements. The method also includes receiving reflected signals at each of the two or more subarrays resulting respectively from transmitting transmit signals from the two or more subarrays, and processing the reflected signals at each of the two or more subarrays to obtain an amplitude associated with each azimuth angle in a range of azimuth angles. A location of the object is determined as the azimuth angle in the range of azimuth angles at which the amplitude exceeds a threshold value.

In addition to one or more of the features described herein, the processing the reflected signals includes implementing a match filter at each of the two or more subarrays to obtain an individual beamforming result at each of the two or more subarrays.

In addition to one or more of the features described herein, the implementing the match filter at each of the two or more subarrays includes multiplying the reflected signals received at the subarray with a reference signal specific to the subarray.

In addition to one or more of the features described herein, the method also includes obtaining the reference signal specific to each of the two or more subarrays includes obtaining a matrix of values corresponding with each azimuth angle in the range of azimuth angles for each position of the two or more antenna elements of the subarray.

In addition to one or more of the features described herein, the method also includes determining the tilt angle of each of the two or more subarrays based on the reference signal at a reference angle and setting a maximum possible tilt angle based on a mounting limit for the radar system.

In addition to one or more of the features described herein, the processing the reflected signals includes adding the individual beamforming results for the two or more subarrays to obtain the amplitude associated with each azimuth angle in the range of azimuth angles.

In addition to one or more of the features described herein, the arranging the array of antenna elements includes implementing the tilt such that individual beamforming results for the two or more subarrays overlap only at the azimuth angle of the object.

In addition to one or more of the features described herein, the arranging the array of antenna elements includes including a same number of the two or more antenna elements in each of the two or more subarrays and separating the two or more antenna elements in each of the two or more subarrays by a same distance, the distance being greater than half a wavelength of the transmit signals.

In addition to one or more of the features described herein, the method also includes disposing the radar system in a vehicle.

In addition to one or more of the features described herein, the method also includes controlling an operation of the vehicle based on information about the object obtained using the radar system.

In another exemplary embodiment, a system to identify an object includes a radar system including an array of antenna elements arranged into two or more subarrays with a tilt angle relative to each other. Each of the two or more subarrays includes two or more antenna elements among the array of antenna elements, the radar system configured to receive reflected signals at each of the two or more subarrays resulting respectively from transmitting transmit signals from the two or more subarrays. The system also includes a processor to process the reflected signals at each of the two or more subarrays to obtain an amplitude associated with each azimuth angle in a range of azimuth angles, and to determine a location of the object as the azimuth angle in the range of azimuth angles at which the amplitude exceeds a threshold value.

In addition to one or more of the features described herein, the processor is configured to implement a match filter at each of the two or more subarrays to obtain an individual beamforming result at each of the two or more subarrays.

In addition to one or more of the features described herein, the processor is configured to implement the match filter at each of the two or more subarrays by multiplying the reflected signals received at the subarray with a reference signal specific to the subarray.

In addition to one or more of the features described herein, the processor is further configured to obtain the reference signal specific to each of the two or more subarrays by obtaining a matrix of values corresponding with each azimuth angle in the range of azimuth angles for each position of the two or more antenna elements of the subarray.

In addition to one or more of the features described herein, the tilt angle of each of the two or more subarrays is based on the reference signal at a reference angle and a maximum possible tilt angle is based on a mounting limit for the radar system.

In addition to one or more of the features described herein, the processor is configured to add the individual beamforming results for the two or more subarrays to obtain the amplitude associated with each azimuth angle in the range of azimuth angles.

In addition to one or more of the features described herein, the individual beamforming results for the two or more subarrays overlap only at the azimuth angle of the object.

In addition to one or more of the features described herein, a same number of the two or more antenna elements is in each of the two or more subarrays, and the two or more antenna elements in each of the two or more subarrays are separated by a same distance, the distance being greater than half a wavelength of the transmit signals.

In addition to one or more of the features described herein, the radar system is in a vehicle.

In addition to one or more of the features described herein, an operation of the vehicle is controlled based on information about the object obtained using the radar system.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 1 is a block diagram of a vehicle with a radar system according to one or more embodiments;

DETAILED DESCRIPTION

Figure 2:
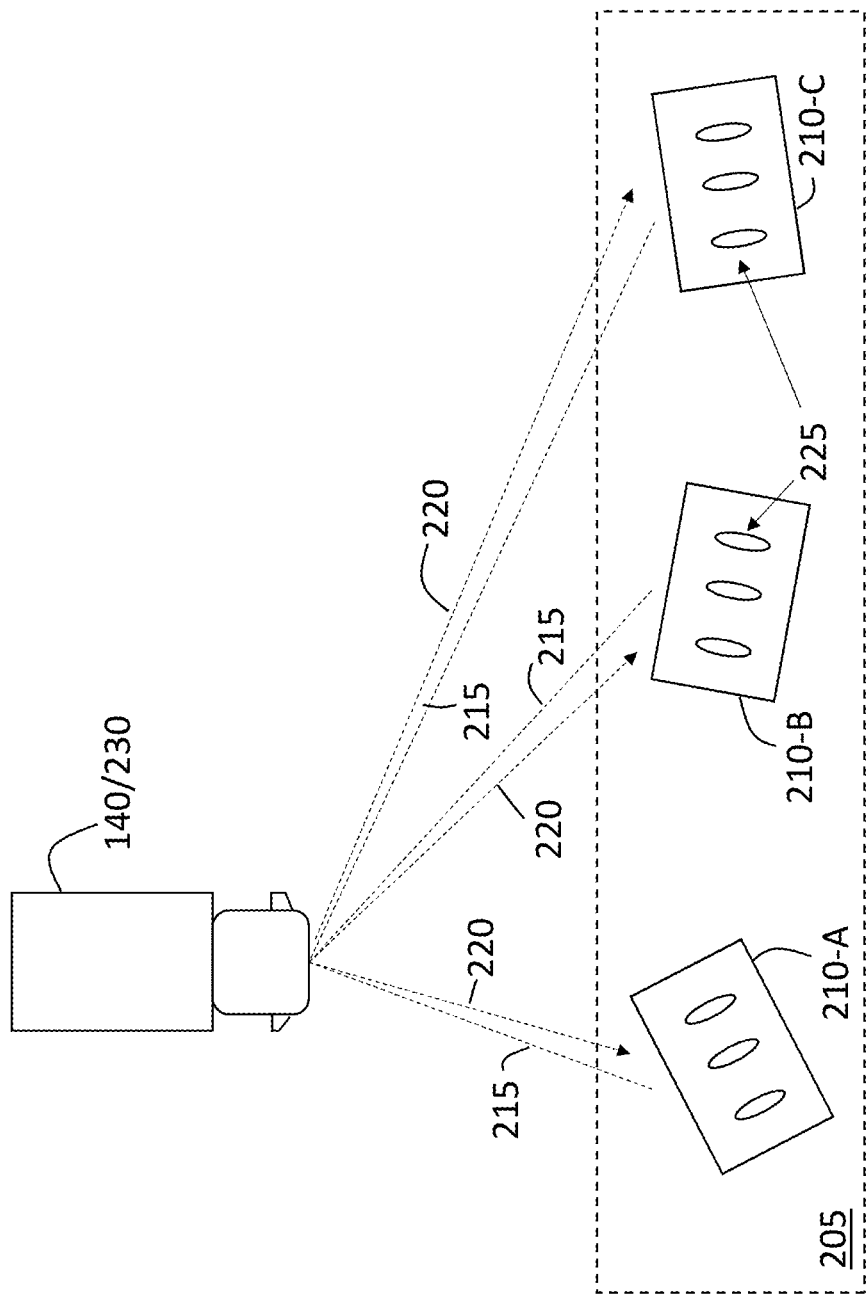
FIG. 2 shows an exemplary antenna array tilt to eliminate false detections in a radar system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a wide aperture of antenna elements in a radar system facilitates obtaining information from a wide field of view. However, a dense array of antenna elements over that width with the requisite half-wavelength spacing between them is costly in terms of components and complexity. At the same time, a more sparse array of antenna elements, which are spaced apart by more than a half-wavelength, results in decreased angular resolution and false detections due to ambiguity in determining the angle of arrival of reflections. Embodiments of the systems and methods detailed herein relate to antenna array tilt and processing to eliminate false detections in a radar system. The antenna array is designed as a set of subarrays with different tilt angles. This results in the angle estimate obtained with each subarray overlapping at the angle associated with the true reflection point of the detected object while separating at other ambiguous angles associated with false detections (i.e., ghost objects). The processing involves recognizing the ghost objects based on the lack of overlap so that real objects may be identified. Based on the array tilt and processing according to one or more embodiments, the advantages of a wide aperture may be obtained without the costs of a dense array.

In accordance with an exemplary embodiment, FIG. 1 is a block diagram of a vehicle 100 with a radar system 110. The exemplary vehicle 100 is an automobile 101. The vehicle 100 may include one or more other sensors 130 (e.g., camera, lidar system) in addition to the radar system 110. The sensor 130 may be used separately or in conjunction with the radar system 110 to detect objects 140 such as the pedestrian 145 shown in FIG. 1. The vehicle 100 also includes a controller 120. Processing of data obtained by the radar system 110 may be performed within the radar system 110 or by the controller 120 using processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. A combination of the radar system 110 and controller 120 may be used to process the data. The controller 120 may control operation of the vehicle 100 (e.g., autonomous driving, semi-autonomous driving such as collision avoidance, automatic braking, adaptive cruise control) based on the detection of objects 140. The radar system 110 is further detailed with reference to FIG. 2.

FIG. 2 shows an exemplary antenna array tilt to eliminate false detections in a radar system 110 according to one or more embodiments. The exemplary antenna array 205 includes three subarrays 210-A, 210-B, 210-C (generally referred to as 210) each with three antenna elements 225. While three exemplary antenna elements 225 are shown for each antenna subarray 210 and three exemplary subarrays 210 are shown for the antenna array 205, the radar system 110 is not limited in the number of antenna elements 225 or the number of antenna subarrays 210 that may be used. Each of the antenna elements 225 of each of the antenna subarrays 210 emits transmit signals 215 and receives reflected signals 220 based on the transmit signals 215 being reflected by an object 140. The exemplary object shown in FIG. 2 is a truck 230. The reflected signals 220 received at each of the antenna subarrays 210 are processed to detect the presence of one or more objects 140 and determine a range and azimuth angle to the detected objects 140. Generally, non-adjacent subarrays 210 may have the same tilt and different antenna subarrays 210 may have different numbers of antenna elements 225. Ambiguity in the angle resolution is created and increased when spacing among antenna elements 225 of an antenna subarray 210 is greater than half the wavelength (2) of the transmit signal 215. While the spacing among antenna elements 225 of different subarrays 210 need not be the same, subarrays 210 that have the same spacing among their antenna elements 225 have the same ambiguity (i.e., the ghost objects will be at the same angles. Thus, different tilts among the subarrays 210, according to one or more embodiments, will effectively resolve the true object 140 angle from ghost object angles.

For L subarrays 210, the tilt angles $\phi_0$ through $\phi_{L-1}$ given by:

$$\phi_0, \phi_1, \ldots, \phi_{L-1} = \mathrm{argmin}_{\phi_0, \phi_1, \ldots, \phi_{L-1}} \|\Sigma_{i=0}^{L-1} \Sigma_{|\theta-\theta_0|<\Delta} a^H(\theta_0, \phi_i) a(\theta, \phi_i)\|^2 \quad \text{[EQ. 1]}$$

EQ. 1 is subject to the condition that every tilt angle $|\phi_i| < \delta$, where $\delta$ is the maximum allowed tilt angle. The value of $\delta$ may be based on a mounting limit for the radar system 110 or other practical limitations. A set of angles $\theta$ are specified not to differ from $\theta_0$ by more than $\Delta$. The value of reference angle $\theta_0$ may be zero, for example, and $\Delta$ is the array resolution given by the wavelength of transmit signals 215 divided by the array aperture. H indicates a conjugate transpose or Hermitian transpose. In addition, the reference signal a for a given antenna subarray 210 is given by:

$$a(\theta, \phi) = \left[ e^{\frac{j2\pi \sin(\theta+\phi)x_0}{\lambda}} \quad \ldots \quad e^{\frac{j2\pi \sin(\theta+\phi)x_{k-1}}{\lambda}} \right]^T \quad [\text{EQ.2}]$$

In EQ. 2, $x_0$ to $x_{k-1}$ are the antenna positions of the k antenna elements 225 of the subarray 210, and T indicates a transpose. The reference signal a for a given subarray 210 yields a value at each azimuth angle $\theta$ for each of k antenna elements 225 of the antenna subarray 210. As previously noted, different subarrays 210 can have different numbers of antenna elements 225. Thus, the dimensions of the reference signal a can be different for different subarrays 210. Processing of the reflected signals 220 may include a first fast Fourier transform (FFT) referred to as a range FFT to obtain the received energy level associated with range at each channel associated with each antenna element 225. A second FFT, referred to as a Doppler FFT, may then be performed to obtain a range-Doppler map per receive channel that indicates the relative velocity of each detected object 140 along with its range. Digital beamforming may then be performed to obtain a range-Doppler map per beam. The beamforming result indicates an amplitude value over a set of azimuth angles. Applying a detection threshold to the amplitude value facilitates the estimation of an angle of arrival of reflected signals 220 (i.e., an angle to a detected object 140 relative to the radar system 110).

The beamforming result for an antenna array 205 with L subarrays 210 with tilt angles $\phi_0, \phi_1, \ldots, \phi_L$ can be represented as:

$$P(\theta) = |\Sigma_{i=0}^{L-1} a^H(\theta, \phi_i) y_i| \quad [\text{EQ. 3}]$$

Figure 3:
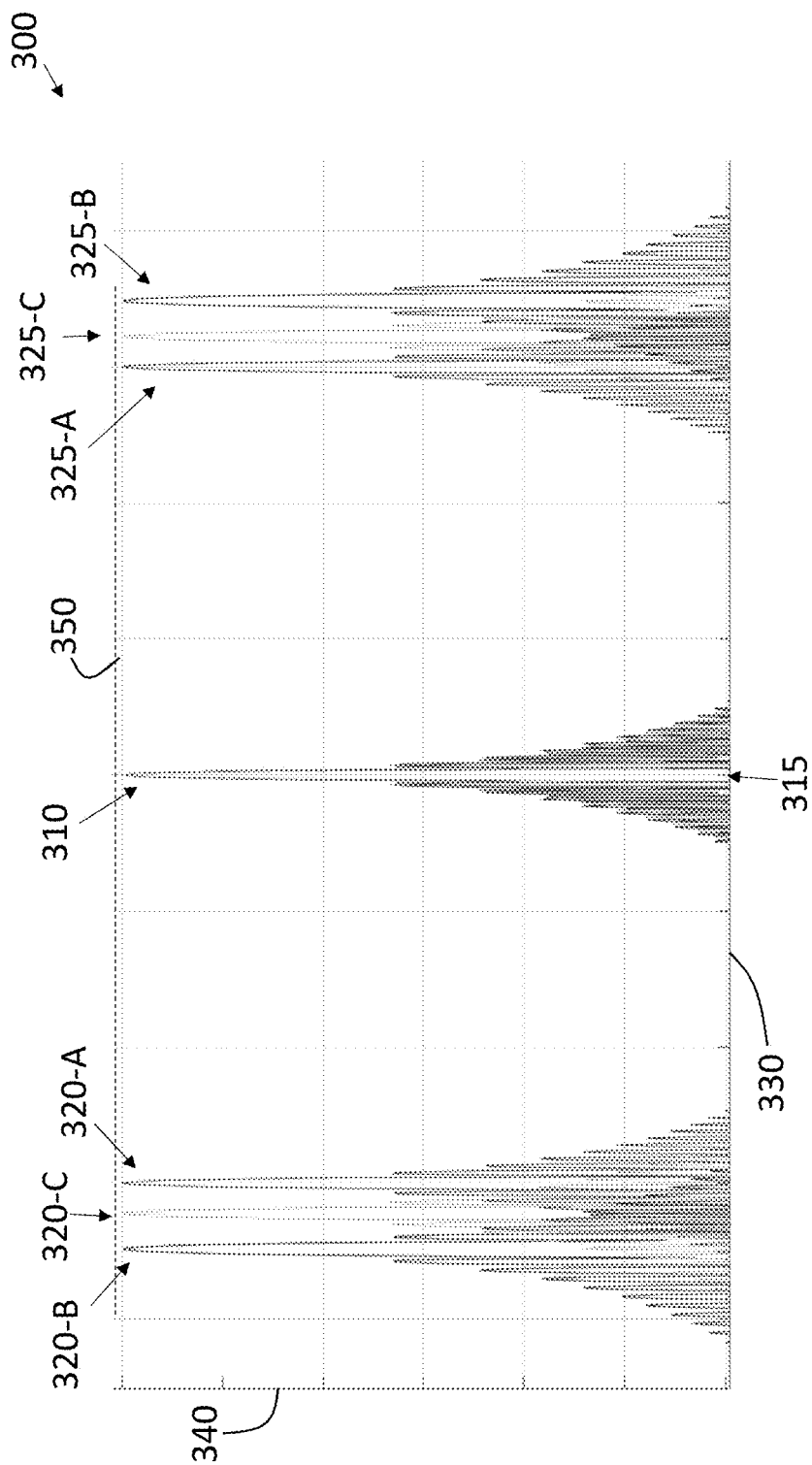
FIG. 3 shows an exemplary beamforming result obtained using antenna array tilt according to one or more embodiments.

In EQ. 3, $y_i$ is the received signal 220 at the $i^{th}$ subarray 210. The individual beamforming result 300 for a given subarray 210 at every azimuth angle $\theta$ (within its field of view) is obtained as a match filter of the received signal 220 $y_i$ with the reference signal a at the azimuth angles $\theta$. As EQ. 3 indicates, the tilt angle $\theta_i$ of the given antenna subarray 210 is considered in the individual beamforming result 300 (FIG. 3). That is, the reference signal a is different for each subarray 210, as discussed with reference to EQ. 2. The beamforming result can be thought of as a probability associated with each angle $\theta$.

FIG. 3 shows exemplary individual beamforming results 300 obtained using antenna array tilt according to one or more embodiments. Azimuth angle is indicated along axis 330, and amplitude is indicated along axis 340. At azimuth angle 315, which corresponds with the true angle to the object 140 (e.g., the truck 230 in the exemplary case), the beamforming results 310 for all three exemplary subarrays 210 overlap. However, the beamforming results 320-A, 320-B, 320-C (generally referred to as 320) respectively corresponding to the three exemplary subarrays 210-A, 210-B, 210-C do not overlap. Similarly, the beamforming results 325-A, 325-B, 325-C (generally referred to as 325) respectively corresponding to the three exemplary subarrays 210-A, 210-B, 210-C do not overlap.

As EQ. 3 indicates, the beamforming result of the antenna array 205 is a sum of the individual beamforming results 300 for the subarrays 210. Thus, the beamforming result of the antenna array 205 will only increase at the angle corresponding with the true angle of the object 140 due to the additive effect of the overlapped beamforming results 310. Consequently, the azimuth angle 315 that corresponds with the true object 140 is distinguishable from azimuth angles corresponding with ghost objects associated with beamforming results 320 and 325. An exemplary detection threshold 350 is indicated in FIG. 3. As FIG. 3 indicates, none of the amplitudes of the individual beamforming results 300 exceeds the detection threshold 350. However, when the individual beamforming results 300 are added, according to EQ. 3, the amplitude at azimuth angle 315, where the individual beamforming results 300 overlap, will exceed the detection threshold 350. That additive effect does not occur at the angles associated with ghost objects, as FIG. 3 shows. Thus, only the true object 140 at azimuth angle 315 will be identified and located according to one or more embodiments.

Figure 4:
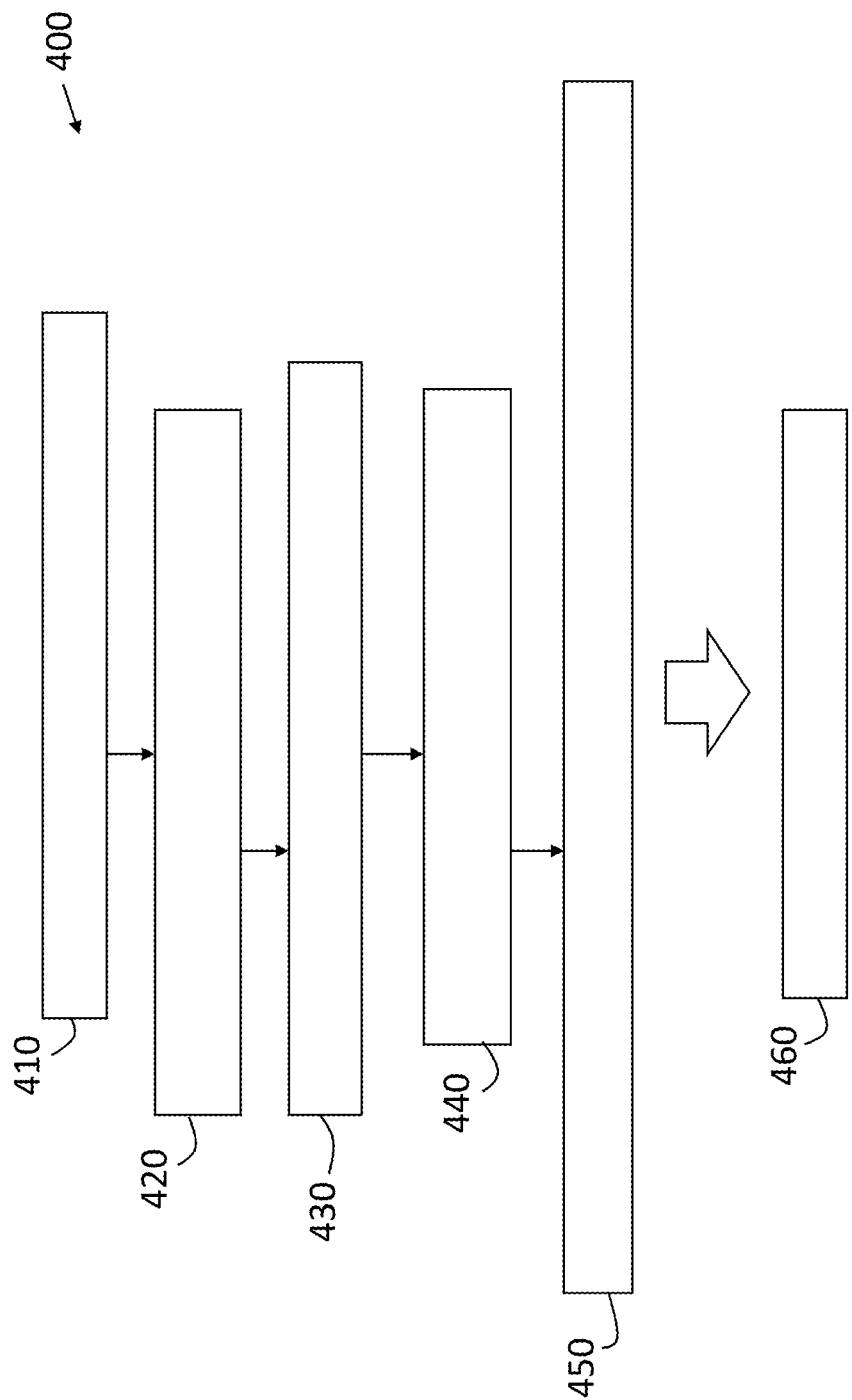
FIG. 4 is a process flow of a method for using antenna array tilt and processing to eliminate false detections in a radar system according to one or more embodiments.

FIG. 4 is a process flow of a method 400 for using antenna array tilt and processing to eliminate false detections in a radar system 110 according to one or more embodiments. At block 410, the method 400 includes arranging subarrays 210 with different tile angles $\phi_i$. Obtaining reflected signals 220 at each subarray 210, at block 420, refers to obtaining $y_i$. At block 430, obtaining the beamforming result for the antenna array 205 is based on EQ. 3. As discussed with reference to EQS. 2 and 3, the beamforming result for the antenna array 205 is a sum of the individual beamforming results 300 for the subarrays 210. The individual beamforming result 300 of any given subarray 210 is obtain using a reference signal a that is specific to the tilt angle $\phi$ and the number of antenna elements 225 of the subarray 210. As discussed with reference to FIG. 3, the individual beamforming results 300 overlap only at the true angle of the object 140 because of the different tilts. Thus, the beamforming result for the antenna array 205 experiences an additive effect only at the true angle of the object 140.

Finding peaks of the beamforming result, at block 440, using a detection threshold, facilitates identifying true objects 140 and estimating their angle relative to the radar system 110, at block 450. When one or more objects 140 are identified and located, controlling vehicle operation, at block 460, refers to autonomous or semi-autonomous control (e.g., collision avoidance, automated braking, adaptive cruise control) that is based on the information from the radar system 110.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of identifying an object using a radar system, the method comprising:
arranging an array of antenna elements into two or more subarrays with a tilt angle relative to each other, wherein each of the two or more subarrays includes two or more antenna elements among the array of antenna elements;
receiving reflected signals at each of the two or more subarrays resulting respectively from transmitting transmit signals from the two or more subarrays;
processing the reflected signals at each of the two or more subarrays to obtain an amplitude associated with each azimuth angle in a range of azimuth angles; and determining a location of the object as the azimuth angle in the range of azimuth angles at which the amplitude exceeds a threshold value.

2. The method according to claim 1, wherein the processing the reflected signals includes implementing a match filter at each of the two or more subarrays to obtain an individual beamforming result at each of the two or more subarrays.

3. The method according to claim 2, wherein the implementing the match filter at each of the two or more subarrays includes multiplying the reflected signals received at the subarray with a reference signal specific to the subarray.

4. The method according to claim 3, further comprising obtaining the reference signal specific to each of the two or more subarrays includes obtaining a matrix of values corresponding with each azimuth angle in the range of azimuth angles for each position of the two or more antenna elements of the subarray.

5. The method according to claim 3, further comprising determining the tilt angle of each of the two or more subarrays based on the reference signal at a reference angle and setting a maximum possible tilt angle based on a mounting limit for the radar system.

6. The method according to claim 2, wherein the processing the reflected signals includes adding the individual beamforming results for the two or more subarrays to obtain the amplitude associated with each azimuth angle in the range of azimuth angles.

7. The method according to claim 6, wherein the arranging the array of antenna elements includes implementing the tilt such that individual beamforming results for the two or more subarrays overlap only at the azimuth angle of the object.

8. The method according to claim 1, wherein the arranging the array of antenna elements includes including a same number of the two or more antenna elements in each of the two or more subarrays and separating the two or more antenna elements in each of the two or more subarrays by a same distance, the distance being greater than half a wavelength of the transmit signals.

9. The method according to claim 1, further comprising disposing the radar system in a vehicle.

10. The method according to claim 9, further comprising controlling an operation of the vehicle based on information about the object obtained using the radar system.

11. A system to identify an object, the system comprising:
a radar system including an array of antenna elements arranged into two or more subarrays with a tilt angle relative to each other, wherein each of the two or more subarrays includes two or more antenna elements among the array of antenna elements, the radar system configured to receive reflected signals at each of the two or more subarrays resulting respectively from transmitting transmit signals from the two or more subarrays; and
a processor configured to process the reflected signals at each of the two or more subarrays to obtain an amplitude associated with each azimuth angle in a range of azimuth angles, and to determine a location of the object as the azimuth angle in the range of azimuth angles at which the amplitude exceeds a threshold value.

12. The system according to claim 11, wherein the processor is configured to implement a match filter at each of the two or more subarrays to obtain an individual beamforming result at each of the two or more subarrays.

13. The system according to claim 12, wherein the processor is configured to implement the match filter at each of the two or more subarrays by multiplying the reflected signals received at the subarray with a reference signal specific to the subarray.

14. The system according to claim 13, wherein the processor is further configured to obtain the reference signal specific to each of the two or more subarrays by obtaining a matrix of values corresponding with each azimuth angle in the range of azimuth angles for each position of the two or more antenna elements of the subarray.

15. The system according to claim 13, wherein the tilt angle of each of the two or more subarrays is based on the reference signal at a reference angle and a maximum possible tilt angle is based on a mounting limit for the radar system.

16. The system according to claim 12, wherein the processor is configured to add the individual beamforming results for the two or more subarrays to obtain the amplitude associated with each azimuth angle in the range of azimuth angles.

17. The system according to claim 16, wherein the individual beamforming results for the two or more subarrays overlap only at the azimuth angle of the object.

18. The system according to claim 11, wherein a same number of the two or more antenna elements is in each of the two or more subarrays, and the two or more antenna elements in each of the two or more subarrays are separated by a same distance, the distance being greater than half a wavelength of the transmit signals.

19. The system according to claim 11, wherein the radar system is in a vehicle.

20. The system according to claim 19, wherein an operation of the vehicle is controlled based on information about the object obtained using the radar system.

* * * * *